United States Patent
Moon

(10) Patent No.: US 11,037,053 B2
(45) Date of Patent: Jun. 15, 2021

(54) DENOISER, AND CONTROL METHOD THEREOF

(71) Applicant: DAEGU GYEONGBUK INSTITUTE OF SCIENCE AND TECHNOLOGY, Daegu (KR)

(72) Inventor: Taesup Moon, Seoul (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 615 days.

(21) Appl. No.: 15/376,875

(22) Filed: Dec. 13, 2016

(65) Prior Publication Data

US 2018/0137405 A1 May 17, 2018

(30) Foreign Application Priority Data

Nov. 15, 2016 (KR) .................. 10-2016-0151924

(51) Int. Cl.
G06N 3/08 (2006.01)
G06N 3/04 (2006.01)

(52) U.S. Cl.
CPC ............ G06N 3/08 (2013.01); G06N 3/0454 (2013.01); G06N 3/0472 (2013.01)

(58) Field of Classification Search
CPC ...... G06N 3/0454; G06N 3/0472; G06N 3/08; Y04S 10/54
See application file for complete search history.

(56) References Cited

U.S. PATENT DOCUMENTS

| | | | | |
|---|---|---|---|---|
| 2005/0289433 | A1* | 12/2005 | Weissman | H04L 1/0045 714/755 |
| 2006/0070256 | A1* | 4/2006 | Weissman | G06T 5/002 34/225 |
| 2007/0096959 | A1* | 5/2007 | Ordentlich | G06T 5/002 341/51 |
| 2008/0025596 | A1* | 1/2008 | Podilchuk | G06K 9/6215 382/155 |

OTHER PUBLICATIONS

Khadivi, Online Denoising Solutions for Forecasting Applications, Aug. 2016 (Year: 2016).*
Moon et al., Neural Universal Discrete Denoiser, Aug. 24, 2016 (11 pages).
Moon, Neural Universal Discrete Denoising, Apr. 22, 2016 (1 page).

* cited by examiner

Primary Examiner — Li B. Zhen
Assistant Examiner — Selene A. Haedi
(74) Attorney, Agent, or Firm — Lex IP Meister, PLLC

(57) ABSTRACT

Disclosed herein is a denoising device including a deriving part configured to, when corrupted noise data corrupted due to noises is received from source data, derive an estimated loss which is estimated when each symbol within noise data is reconstructed to the source data based on a predefined noise occurrence probability, a processor to process training of a defined learning model by including parameters related with the reconstruction of the source data from the noise data based on context composed of a sequence of neighbored symbols based on each symbol within the noise data and pseudo-training data using the estimated loss corresponding to the context, and an output part to output reconstructed data in which each symbol within the noise data is reconstructed to a symbol of the source data through a denoiser formed based on a result of the training processing.

9 Claims, 2 Drawing Sheets

DENOISER, AND CONTROL METHOD THEREOF

CROSS-REFERENCE TO RELATED APPLICATIONS

This application claims priority from Korean Patent Application No. 10-2016-0151924, filed on Nov. 15, 2016 in the Korean Intellectual Property Office, the disclosure of which is incorporated herein by reference in its entirety.

BACKGROUND

1. Technical Field

The present disclosure relates to a noise reduction technology for obtaining an optimum denoiser through a deep learning algorithm training method by applying Discrete Universal DEnoiser (DUDE) approach.

2. Description of the Related Art

A noise reduction technology indicates a technology for restoring originally designated information by removing undesired noises from the received information, and a spatial filtering method is one of examples. Such spatial filtering method includes a context-based noise removal technology such as Discrete Universal DEnoiser (DUDE).

Meanwhile, the deep learning having Deep Neural Network (DNN) as architecture is one of machine learning technologies; machines are allowed to collect, abstract, and learn information by themselves.

DNN is currently applied in various fields such as voice recognition, image recognition, machine translation, etc. As well as the above applications, there is an example of application with respect to an image denoising in the denoising field corresponding to the noise reduction technology described above.

However, the related DUDE causes great fluctuations in performance depending on the hyperparameters selected, and has a problem in which it cannot provide a method for obtaining a sliding window size value ('k') to be selected as an optimum value for representing high performance.

Further, when a supervised learning requesting a massive amount of training data for the learning is used, DNN applied to the related denoising field shows problems in which considerable costs for securing training data are incurred, and the learning model itself is hard to be applied at a circumstance having difficulty in securing clean uncorrupted data.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is directed to obtaining an optimum denoiser by training deep learning algorithms with utilization of a pseudo-label derived from context and estimated losses as training data of objective functions according to Discrete Universal DEnoiser (DUDE).

According to an embodiment, a denoising device includes an deriving part configured to derive an estimated loss which is estimated when each symbol within noise data is reconstructed to recover source data based on a predefined noise occurrence probability if the corrupted noise data is received from the source data due to noises, a processor configured to process training of a defined learning model by including parameters related with the reconstruction of the source data from the noise data based on pseudo-training data comprising context composed of a sequence of symbols neighboring each symbol within the noise data and the estimated loss corresponding to the context, and an output part configured to output reconstructed data in which each symbol within the noise data is reconstructed to recover a symbol of the source data through a denoiser formed based on the training processing result.

More specifically, the denoising device further includes a forming part configured to form each denoiser based on the parameters obtained through the training for each sliding window size k determining a size of the context, and a selecting part configured to select a specific sliding window size minimizing an estimated loss by calculating an estimated loss occurred when the noise data is reconstructed to recover the source data by using each denoiser formed for each sliding window size.

More specifically, the output part may output the reconstructed data through a denoiser according to the specific sliding window size.

More specifically, the noise data may be corrupted data due to the noises occurred at a discrete memoryless channel as the source data passes through the discrete memoryless channel, and the noise occurrence probability may be defined as a probability in which each symbol within the source data is transited to another symbol due to the noises at the discrete memoryless channel.

According to an embodiment, a noise removal method includes deriving an estimated loss which is estimated when each symbol within noise data is reconstructed to recover source data based on a predefined noise occurrence probability if the corrupted noise data is received from the source data due to noises, defining a learning model including parameters related with the reconstruction of the source data from the noise data, processing training of the learning model based on pseudo-training data comprising context composed of a sequence of symbols neighboring each symbol within the noise data and the estimated loss corresponding to the context, and outputting reconstructed data in which each symbol within the noise data is reconstructed to a symbol of the source data through a denoiser formed based on the training processing result.

More specifically, the noise removal method further includes forming each denoiser based on the parameters obtained through the training for each sliding window size k determining a size of the context before the outputting, and selecting a specific sliding window size minimizing an estimated loss by calculating an estimated loss occurred when each symbol within the noise data is reconstructed to the source data with the utilization of each denoiser formed for each sliding window size.

More specifically, the outputting may output the reconstructed data through a denoiser according to the specific sliding window size.

More specifically, the noise data may be corrupted data due to the noises occurred at a discrete memoryless channel as the source data passes through the discrete memoryless channel, and the noise occurrence probability may be defined as a probability in which each symbol within the source data is transited to another symbol due to the noises at the discrete memoryless channel.

According to an embodiment, the noise removal method may be a computer program configured to implement each process of the method and stored in computer readable recording medium.

According to an embodiment, the noise removal method may be a computer readable recoding medium including instructions to implement each process of the method.

Accordingly, a denoising device and a noise removal method result in effects of the supervised learning without requiring provision of source data, by using context and pseudo-label pairs derived from an estimated loss corresponding to the context as training data of a modeled entropy objective equation so as to optimize parameters of a denoiser with the utilization of a discrete universal denoiser method.

Further, the denoising device and the noise removal method may considerably encourage the noise reduction performance by automatically determining a denoiser designed with an optimum parameter value derived by such learning, and an optimum sliding window size value 'k' optimized for corresponding denoiser.

BRIEF DESCRIPTION OF THE DRAWINGS

The above and/or other aspects of the present inventive concept will be more apparent by describing certain exemplary embodiments of the present inventive concept with reference to the accompanying drawings.

DETAILED DESCRIPTION OF EXEMPLARY EMBODIMENTS

Figure 1:
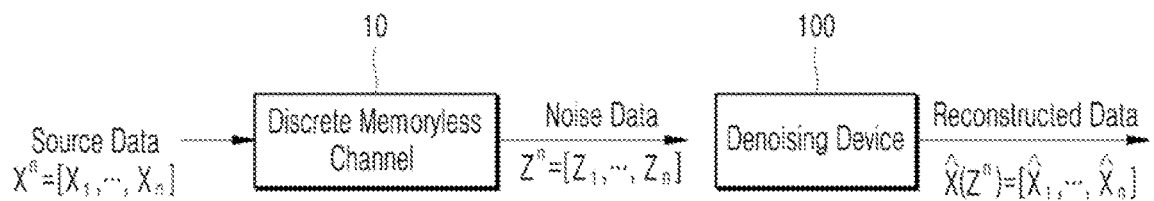
FIG. 1 is a diagram illustrating a noise removal environment according to an embodiment.

Various embodiments are now described with reference to the drawings. In the following description, for purposes of explanation, numerous specific details are set forth in order to provide a thorough understanding of one or more embodiments. It may be evident, however, that the various embodiments can be practiced without these specific details.

As used in the present disclosure, the terms "component", "module", "system", and the like are intended to refer to a computer-related entity, but is not limited to being, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. Further, such components may be implemented by various computer readable recording medium having stored various data structures. The components may communicate through a local and/or remote process according to signals having one or more data packets, for example, signals from data interacting with another component in a local system or a distributed system and/or interacting with other systems through signals in an Internet.

Cleaning of noise-corrupted data related with the present disclosure, i.e., denoising is a task encountered anywhere in the field of signal processing and the machine learning. Specifically, in the discrete denoising, fundamental corrupted source data and noise data have their values in a finite set. Such setting may be applied in various domains such as image denoising, DNA sequence denoising, and channel decoding.

As a related method for solving a denoising problem, there is Bayesian method which may yield a computationally efficient algorithm with reasonable performance. However, when the assumed stochastic models do not accurately reflect the real data distribution, some limitations may occur. Specifically, while noise models may be obtained relatively reliably, an accurate model for the source clean data is much difficult to be obtained. The model for the source clean data may be wrong, changing or may not exist at all.

In order to alleviate such limitations, Discrete Universal DEnoising (DUDE), which is universal method for the discrete denoising, is suggested. Such method considers general setting that the clean finite-valued source symbols are corrupted by a discrete memoryless channel (DMC), which is a noise mechanism that corrupts each source symbol independently and statistically identically. Thereafter, the source data may be assumed from noise data by using DUDE algorithms. DUDE may be implemented as computationally efficient sliding window denoiser. However, DUDE has a problem in which the performance is sensitive on the choice of a window size, k, which has to be hand-tuned without the systematic rule. Further, when k increases and an alphabet size of a signal also increases, DUDE has a problem of data sparsity, which deteriorates the performance.

Meanwhile, attempts of applying neural networks to the gray scale image denoising have been made, but these all remained in supervised setting, in which large-scale training data that consists of clean and noisy image pairs was necessary. Such method requires massive computation resources and training data, e.g., may have a problem that they are not always transferable to other denoising applications, in which collecting massive training data is often expensive, e.g., DNA sequence denoising.

In the present disclosure, a new framework for solving problems associated with DUDE and neural networks described above is provided, by utilizing deep neural network (DNN) in combination with DUDE. Further, an embodiment of the present disclosure applies setting of DUDE, which does not require additional data except for the given noise data. However, in this case, because there is no actual ground-truth label for the supervised training of network, it may be difficult to apply to DNN. That is, because a target label to be estimated through observation with the denoising algorithm is the underlying clean signal before being corrupted, it can never be observed to the denoising algorithm. Therefore, according to an embodiment, "pseudo-labels" for training DNN based on DMC assumption and finiteness of data values is devised. The pseudo-labels are based on the unbiased estimate of the true loss incurred by the denoising algorithm, and it is possible to train DNN as universal discrete denoiser by utilizing the devised pseudo-labels and generalized cross-entropy objective function. Further, according to an embodiment, an accurate estimator of the true denoising performance may be obtained, and as a result, a proper window size k may be selected systematically.

Denoiser based DNN (also referred to as 'Neural DUDE') disclosed herein may perform better performance compared to DUDE while keeping robustness with respect to k. Meanwhile, although an embodiment is described to be focused on the discrete denoising, the suggested framework may be applied to the denoising of a continuous-valued signal as well.

Referring to the attached drawings, the exemplary embodiments will be described in detail below.

FIG. 1 is a diagram illustrating a noise removal environment according to an embodiment.

As illustrated in FIG. 1, the noise removal environment according to an embodiment may include a denoising device 100 which receives the corrupted noise data ($Z^n=[Z_1, \ldots, Z_n]$) from the source data ($X^n=[X_1, \ldots, X_n]$) due to noises occurred at the discrete memoryless channel 10 as the source data ($X^n=[X_1, \ldots, X_n]$) passes through the discrete memoryless channel 10 and outputs reconstructed data ($\hat{X}(Z^n)=[\hat{X}_1, \ldots, \hat{X}_n]$) in which each symbol within the noise data is reconstructed into a symbol of the source data.

For explanation of notation used herein, a sequence (n-tuple) may be represented with $a^n=(a_1, \ldots, a_n)$, and a subsequence may be represented with $a_i^j=(a_i, \ldots, a_j)$.

The denoising device 100 may graft and utilize the discrete universal denoiser technology and the deep neural network technology which are context based noise removal technologies, and implement a method for training the deep learning algorithm by using the discrete universal denoiser method, thus resulting in an optimum denoiser for the noise removal.

Meanwhile, in a related discrete universal denoiser technology, great variations may occur in the performance according to the choice of hyperparameter, and particularly, a method for obtaining a sliding window size k to be chosen as an optimum value to show higher performance cannot be provided.

As used herein, a 'sliding window size k' indicates a hyperparameter to determine a size (range) of context corresponding to a set of a sequence of neighbored symbols based on each symbol within the noise data.

Further, when the supervised learning requiring a massive amount of training data is used for the learning in a related deep neural network technology, considerable costs may be needed to secure the training data, and there occurs another problem that it is difficult to apply a learning model itself at a circumstance having difficulty to obtain the clean data.

An embodiment of the present disclosure suggests a method for obtaining an optimum denoiser by training the deep learning algorithm using the pseudo-label derived from context and estimate of loss according to the discrete universal denoiser method as training data of an objective function. Hereinbelow, configuration of the denoising device 100 to achieve the method described above will be described in greater detail.

Figure 2:
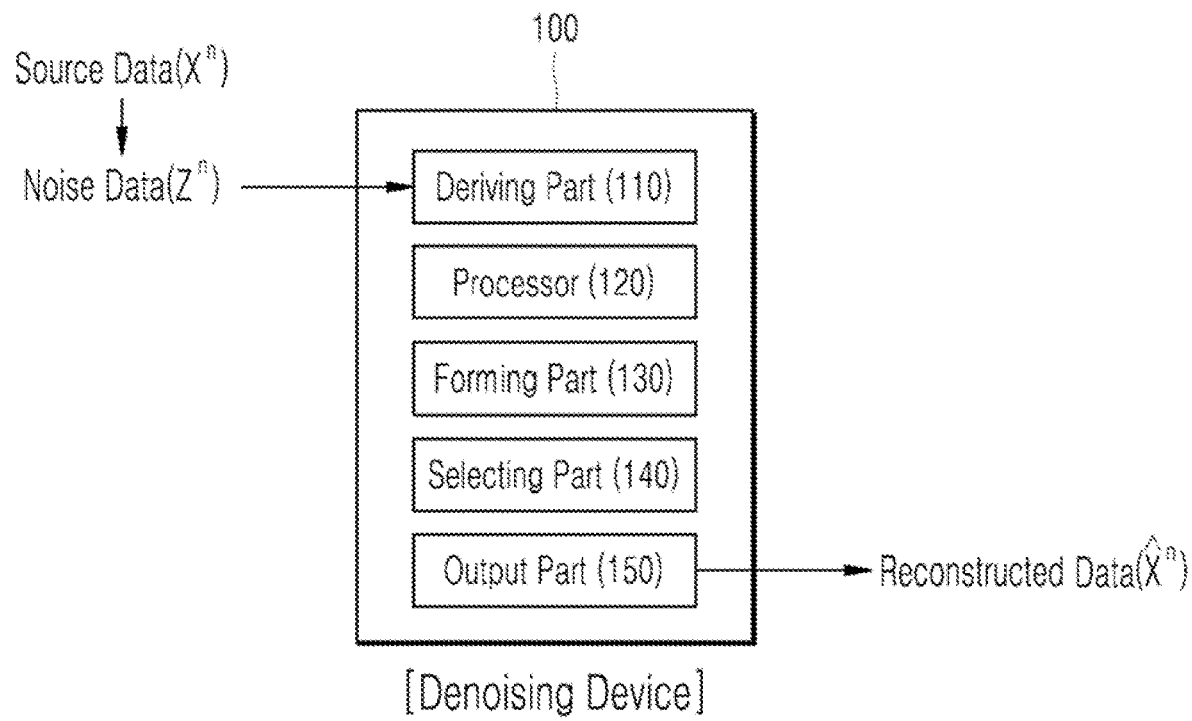
FIG. 2 is a brief block diagram of a denoising device according to an embodiment.

FIG. 2 illustrates brief configuration of the denoising device 100 according to an embodiment.

As illustrated in FIG. 2, the denoising device 100 according to an embodiment may have configurations including an deriving part 110 for deriving an estimated loss as the noise data is reconstructed to the source data, a processor 120 for processing training of the learning model, a forming part 130 for forming the denoiser for each sliding window size, a selecting part 140 for selecting an optimum sliding window size for noise removal, and an output part 150 for outputting the reconstructed data through the denoiser according to the selected optimum sliding window size.

All or some of the configurations of the denoising device 100 including the deriving part 110, the processor 120, the forming part 130, the selecting part 140 and the output part 150 may be implemented to be hardware module, software module, or combination of the hardware module and the software module.

As used herein, the software module may be understood as instructions executed by the processor for processing computation within the denoising device 100, and such instructions may have a form stored in a memory within the denoising device 100 or in a separate memory.

In summary, the denoising device 100 according to an embodiment may obtain an optimum denoiser by training the deep learning algorithm using the pseudo-label derived from context and estimated losses according to the discrete universal denoiser method through the above configuration as training data of the objective function. The respective configurations of the denoising device 100 to achieve the above will be described in greater detail below.

The deriving part 110 may perform a function of deriving an estimated loss as the noise data ($Z^n$) is reconstructed to the source data ($X^n$).

More specifically, when the corrupted noise data ($Z^n$) is received from the source data ($X^n$) due to the noises occurred at the discrete memoryless channel 10, the deriving part 110 may derive an estimated loss which is estimated when each symbol within the noise data ($Z^n$) is reconstructed to the source data ($X^n$) based on a predefined noise occurrence probability.

As used herein, the noise occurrence probability may be previously defined as a probability in which each symbol within the source data ($X^n$) at the discrete memoryless channel 10 is transited to another symbol due to the noises.

In the above case, all of the source data ($X^n$), the noise data ($Z^n$), and the estimated data ($\hat{X}^n$) may take a value in a finite set, and the discrete memoryless channel 10 may be completely characterized by a channel transition matrix $\Pi$.

As used herein, (x, z)-th element of the channel transition matrix $\Pi$ may represent a probability in which $Z_i$ is z if $X_i$ is x, and further, a loss according to difference between the source data $X^n$ and the estimated (reconstructed) data $\hat{X}^n$ may be represented with true loss function, $\Lambda(X, s(Z))$.

Further, a single symbol denoiser for estimating $\hat{X}$ in the noise data Z may be represented with $s(Z)=\hat{X}$, and the true loss function may be represented with $\Lambda(X, s(Z))$.

Meanwhile, the source data before being corrupted at a discrete universal denoiser utilization environment is not known.

Accordingly, in order to estimate a loss in a state of not knowing the source data X, the following definition of a mathematical formula 1 may derive an estimated loss, L(Z, s(Z)), which uses only the observed noise data Z and the selected denoiser s(Z) while representing an unbiased estimated loss of the true loss function $\Lambda(X, \hat{X})$.

$$\rho(x, s) = \sum_{z \in \mathcal{Z}} \Pi(x, z) \Lambda(x, s(z)) = \mathbb{E}_x \Lambda(x, s(Z)), \quad \text{[Formula 1-1]}$$

$$x \in X, s \in \mathcal{S}.$$

$$L \triangleq \Pi^{-1} \rho \in \mathbb{R}^{|\mathcal{Z}| \times |\mathcal{S}|}$$

If $\Pi$ is not a square, $\Pi^{-1}$ may be substituted with the right inverse of $\Pi$. Meanwhile, the following formula may prove that an estimated loss L(Z, s(Z)) is an unbiased estimated value of $\mathbb{E}_x \Lambda(x, s(Z))$.

$$\mathbb{E}_x L(Z, s) = \sum_z \Pi(x, z) \sum_{x'} \Pi^{-1}(z, x') \rho(x', s) = \quad \text{[Formula 1-2]}$$

$$\delta(x, x') \rho(x', s) = \rho(x, s) = \mathbb{E}_x \Lambda(x, s(Z)).$$

The processor 120 may process training of the defined learning model so as to include parameters related with the reconstruction of the source data ($X^n$) from the noise data ($Z^n$).

More specifically, when the deriving of an estimated loss is completed, the processor 120 may process training of the defined learning model by including parameters related with the reconstruction of the source data ($X^n$) from the noise data ($Z^n$) based on context composed of a sequence of neighbored symbols with reference to each symbol within the noise data ($Z^n$) and the pseudo-training data using an estimated loss corresponding to the context.

Meanwhile, the reconstructed data estimated at a i-th location with a denoiser of the sliding window size k for a sequence of the noise data $Z^n$ may be represented with $\hat{X}_i(z^n) = s_k(z_{i-k}^{i+k}) = s_k(c_i, z_i)$, and a denoiser satisfying a condition of minimizing the estimated loss function $L(Z, s)$ as in the following mathematical formula 2 may be selected as an optimum denoiser.

$$s_{k,DUDE}(c, \cdot) = \arg\min_{s \in S} \sum_{\{i: c_i = c\}} L(z_i, s) \quad \text{[Formula 2]}$$

The conditional formula for selecting (determining) a denoiser expressed with the above mathematical formula 2 may also be expressed in vector notation so as to be used in the neural network, in which case a probability vector of each c may be expressed as in mathematical formula 3 below.

$$\hat{p}(c) \triangleq \arg\min_{p \in \Delta^{|S|}} \left( \sum_{\{i: c_i = c\}} \mathbb{1}_{z_i}^T L \right) p, \quad \text{[Formula 3]}$$

where, $\Delta^{|S|}$ is a probability simplex within $\mathbb{R}^{|S|}$, and $\hat{p}(c)$ is on a vertex of $\Delta^{|S|}$ corresponding to $s_{k,DUDE}(c, \cdot)$. Further, $s_{k,DUDE}(c, \cdot)$ may be obtained with $s_{k,DUDE}(c, \cdot) = \arg\max_s \hat{p}(c)_s$ where, $\hat{p}(c)_s$ indicates a s-th coordinate of $\hat{p}(c)$.

The estimated loss matrix L which does not depend on a source sequence $x^n$ may be used in DUDE. However, because DUDE has a disadvantage of treating each context c independently from the other contexts, when a context size k increases, a number of different contexts $|C_k| = |Z|^{2k}$ may exponentially increase according to k, and a sample size of each context $|\{i: c_i = c\}|$ may exponentially decrease for a given sequence length n. Such phenomenon may hinder concentration of $\Sigma_{i \in \{i: c_i = c\}} L(Z_i, s)$, and accordingly, when k becomes too much greater, a problem of deteriorated performance of DUDE may occur.

In order to resolve the above problem, information of similar contexts may be shared through network parameters in Neural DUDE using a single neural network.

Meanwhile, a new $L_{new}$ may be defined as in following mathematical formula 4 by using the estimated loss function for use as the pseudo-label.

$$L_{new} \triangleq -L + L_{max} \mathbb{1}\mathbb{1}^T \text{ (where, } L_{max} \triangleq \max_{z,s} L(z, s) \text{)}$$

As a result, mathematical formula 2 may be modified into mathematical formula 3, and the objective function which is the learning model applied with the neural network such as following mathematical formula 5 may be defined by using the newly defined $L_{new}$. A parameter w for determining an optimum denoiser on every context ($c_i$) case may be derived through training of the learning model.

$$\mathcal{L}(w, z^n) \triangleq \frac{1}{n} \sum_{i=1}^n C(L_{new}^T \mathbb{1}_{z_i}, p(w, c_i)) \quad \text{[Formula 5]}$$

where, $\{(c_i, L_{new}^T \mathbb{1}_{z_i})\}_{i=1}^n$ may be used as training data of input-label pairs, and $L_{new}^T \mathbb{1}_{z_i}$ may be treated as a "target pseudo-label" that can substitute a true label at a circumstance in which the source data is not known.

An optimum parameter w for all contexts may be derived by training with such pseudo-label data.

The forming part 130 may perform a function of forming a denoiser for each sliding window size k.

More specifically, when optimum parameter w with respect to each context is derived as a result of completing the learning of the objective function which is a learning model applied with the neural network based on pseudo-training data utilizing context and an estimated loss corresponding to the context, the forming part 130 may form a denoiser for each sliding window size k based on the derived parameter w.

In an example, a single-symbol denoiser formed based on the derived parameter w as a result of training through the pseudo-label data and the reconstruction at i-th location may be formed according to mathematical formula 6 below.

$$s_{k,Neural\ DUDE}(c, \cdot) = \arg\max_s p(w^*, c)_s \quad \text{[Formula 6]}$$

$$\hat{X}_{i,DUDE}(z^n) = s_{k,Neural\ DUDE}(c_i, z_i)$$

According to mathematical formulae 5 and 6, because $w^*$ is learned from all data and shared across all contexts, information may be shared between different contexts in Neural DUDE. Such feature allows Neural DUDE to operate with robustness without being encountered with a data sparsity problem at greater k than DUDE. Accordingly, when greater k is taken, the denoising performance of Neural DUDE may be significantly enhanced compared to DUDE.

Further, while the concentration $$\frac{1}{n} \sum_{i=1}^n L(Z_i, s_{k,Neural\ DUDE}(c_i, \cdot)) \approx \frac{1}{n} \sum_{i=1}^n \Lambda(x_i, s_{k,Neural\ DUDE}(c_i, Z_i))$$

holds with high probability even for very large k's in Neural DUDE, such concentration may easily break as k becomes greater in DUDE.

Meanwhile, using the characteristic described above, a systematic mechanism for selecting an optimum context size k with respect to Neural DUDE may be provided. For example, $$k^* = \arg\min_k \frac{1}{n} \sum_{i=1}^n L(Z_i, s_{k,Neural\ DUDE}(c_i, \cdot))$$

The selecting part 140 may perform a function of selecting an optimum sliding window size for noise removal.

More specifically, if forming a denoiser for each sliding window size is completed based on the parameter w derived from the result of learning, the selecting part 140 may compute an estimated loss occurred when each symbol within the noise data is reconstructed to the source data by using each of the denoisers formed, and select a specific sliding window size k, which minimizes the computed estimated loss, as optimum sliding window size K.

In an example, an estimated loss, which is occurred when each symbol within the noise data is reconstructed to the source data through each denoiser, may be computed according to following mathematical formula 7. The specific sliding window size k that can minimize an estimated loss may be selected as an optimum sliding window size for the reconstruction of the source data.

$$L_k \triangleq \frac{1}{n}\sum_{i=1}^{n} L(z_i, s_{k,Neural\ DUDE}(c_i, \cdot))$$ [Formula 7]

The output part 150 may perform a function of outputting the reconstructed data through the denoiser according to the selected optimum sliding window size.

More specifically, when a specific sliding window size k that minimizes an estimated loss is selected as an optimum sliding window size for the reconstruction of the source data, the output part 150 may output the reconstructed data in which a symbol within the noise data is reconstructed to a symbol of the source data through the denoiser formed according to corresponding specific sliding window size.

As a result, when an optimum denoiser is formed (determined) with respect to all contexts through training of a learning model using the pseudo-label data without any information of the source data, an optimum sliding window size k for reconstructing the noise data to the source data may be also possibly selected with a method of computing an estimated loss for each denoiser. Further, when an optimum sliding window size k is selected, the reconstructed data ($\hat{X}_i$) of following mathematical formula 8 may be outputted through the denoiser according to k corresponding to the optimum sliding window size.

$$\hat{X}_{i,Neural\ DUDE}(z^n) = s_{k,Neural\ DUDE}(c_i, z_i) \text{ for } i=1,\ldots,n$$ [Formula 8]

As described above, unlike in a related discrete universal denoiser technology, the configuration of the denoising device 100 according to an embodiment may accurately derive a sliding window size having robust feature against changes of hyperparameters and selected as an optimum value by using the deep neural network technology, and provide the derived pseudo-label as training data by using the estimated loss function derived from DUDE at a circumstance in which training data (data having ground-truth label) cannot be provided due to unknown source data, thus training the deep neural network model.

Figure 3:
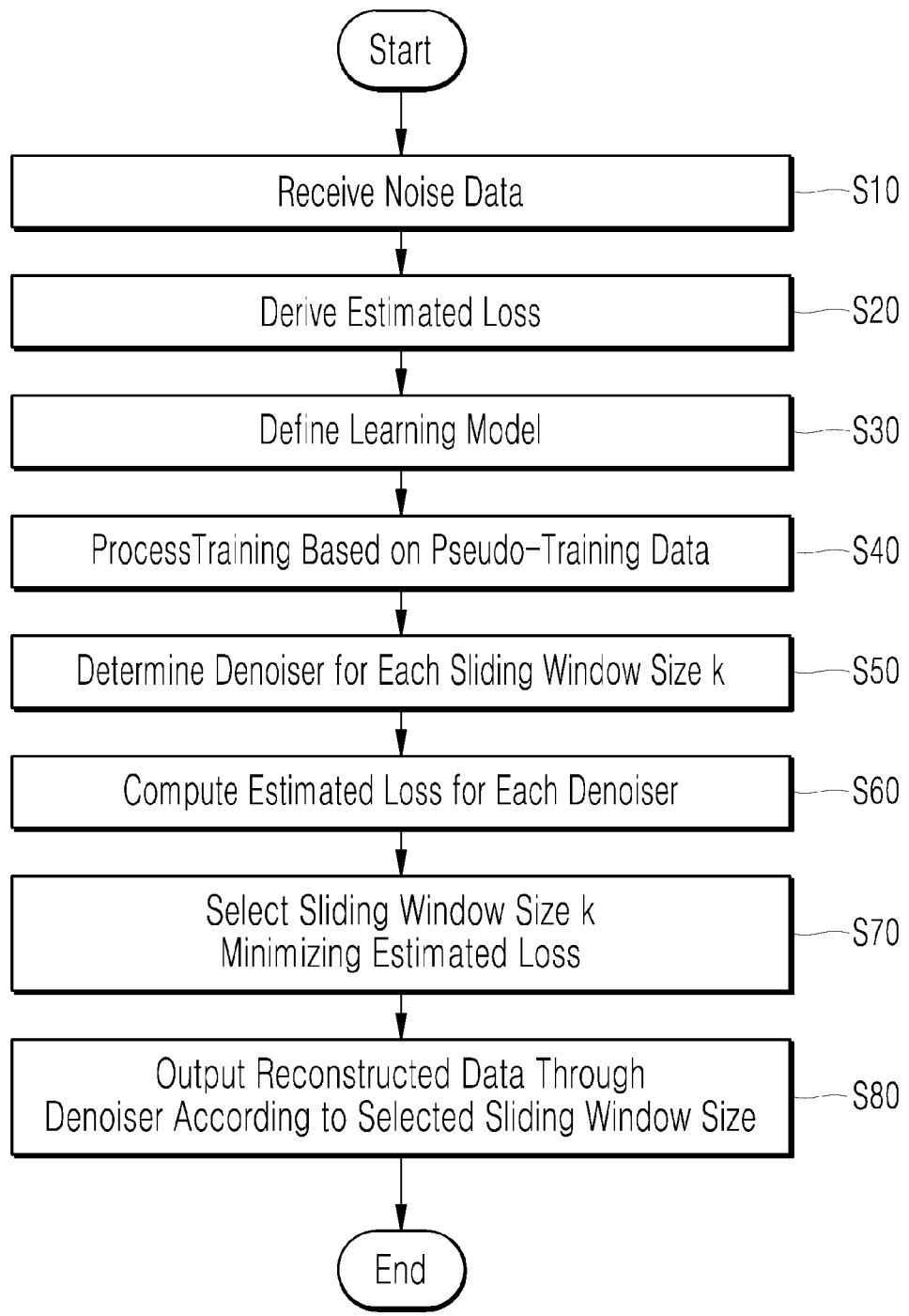
FIG. 3 is a flowchart provided to explain a flow of operations at a denoising device according to an embodiment.

An operation of the denoising device 100 according to an embodiment will be described below by referring to FIG. 3.

First, when the corrupted noise data is received from the source data due to the noises occurred at the discrete memoryless channel 10 at S10 and S20, the deriving part 110 may derive an estimated loss which is estimated when each symbol within the noise data is reconstructed to the source data based on a predefined noise occurrence probability.

In an example, the noise occurrence probability may define a probability in which each symbol within the source data is transited to another symbol due to the noises at the discrete memoryless channel 10.

When deriving an estimated loss is completed, the processor 120 may define a learning model applied with the neural network so as to include parameters related with the reconstruction of the source data from the noise data, and process training of the learning model based on context composed of a sequence of neighbored symbols with reference to each symbol within the noise data and pseudo-training data using an estimated loss corresponding to the context at S30 and S40.

Thereafter, the forming part 130 may form a denoiser for each sliding window size k based on the derived parameter w at S50 when an optimum parameter w of each context is derived by completing the learning based on context of the objective function which is a learning model applied with the neural network and pseudo-training data using an estimated loss corresponding to the context.

Further, when the formation of the denoiser for each sliding window size based on the parameter w derived as a result of learning is completed, the selecting part 140 may compute an estimated loss occurred in a case of reconstructing each symbol within the noise data to the source data using each denoiser as formed, and select a specific sliding window size k that minimizes the computed estimated loss as an optimum sliding window size k at S60 and S70.

When a specific sliding window size k that minimizes an estimated loss is selected as an optimum sliding window size for the reconstruction of the source data, the output part 150 may output the reconstructed data as a result of reconstructing a symbol within the noise data to a symbol of the source data through the denoiser formed according to the selected specific sliding window size at S80.

As a result, when an optimum denoiser is formed (determined) for all contexts through training of a learning model using the pseudo-label data without provision of any information of the source data, an optimum sliding window size k for reconstructing the noise data to the source data with the method of computing an estimated loss for each denoiser may be also possibly selected. Further, when an optimum sliding window size k is selected, the reconstructed data may be outputted as a result of reconstruction to the source data through the denoiser according to k corresponding to the optimum sliding window size.

As described above, unlike in a related DUDE technology, with the utilization of the deep neural network technology, the flow of operation of the denoising device 100 according to an embodiment may accurately derive a sliding window size that has robust characteristic against changes of hyperparameters and that has to be selected as an optimum value, and may also train the deep neural network model by providing the pseudo-label, which is derived by using the estimated loss function derived from DUDE at a circumstance in which training data (data having the ground-truth label) cannot be provided due to unknown source data, as training data.

Meanwhile, embodiments of the subject matter and the operations described in this specification can be implemented in digital electronic circuitry, or in computer software, firmware, or hardware, including the structures disclosed herein and their structural equivalents, or in combinations of one or more of them. Embodiments of the subject matter described herein can be implemented as one or more computer programs, i.e., one or more modules of computer program instructions, encoded on computer storage medium for execution by, or to control the operation of, data processing apparatus.

A computer readable recording medium can be machine readable storage device, machine readable storage substrate, memory device, a composition of materials that influence machine-readable propagated signal, or a combination of one or more of these.

In the present disclosure, "system" or "device" may encompass all equipment, devices, and machines including a programmable processor, a computer, or a multiprocessor or a computer to process data. The processing system, added with hardware, may include codes for, when requested, forming a running environment of a computer program such as codes constituting processor firmware, protocol stack, database management system, operating system, or a combination of one or more among the above.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

A computer readable recording medium suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

A denoising device and a noise removal method according to an embodiment may be industrially applicable because it enables not only the utilization of a related technology but also sufficient possibility of selling or trading of an applied device, by overcoming limitations of the related technology as it can obtain an optimum denoiser through a method of training a deep learning algorithm with Discrete Universal DEnoiser (DUDE) approach.

LIST OF REFERENCE NUMBERS

100: DENOISING DEVICE
110: DERIVING PART
120: PROCESSOR
130: FORMING PART
140: SELECTING PART
150: OUTPUT PART

What is claimed is:
1. A denoising device, comprising:
a memory storing instructions;
a processor configured to execute the instructions to:
train a deep learning algorithm for obtaining an optimum denoiser by performing training operations comprising:
when corrupted noise data that is corrupted due to noises is received from unknown source data, deriving an estimated loss which is estimated from the noise data, by reconstructing each symbol within the noise data to recover the unknown source data based on a predefined noise occurrence probability;
computing context data composed of a sequence of symbols neighboring each symbol within the noise data of the unknown source data;
training deep neural network model including parameters related with the reconstruction of the unknown source data from the noise data by using pseudo-training data, the pseudo-training data computed based on the estimated loss used as pseudo-label data and the context data; and implement the deep learning algorithm by performing implementing operations comprising:

determining an optimum denoiser for the noise data using the deep neural network model; and outputting reconstructed data in which each symbol within the noise data is reconstructed to recover a symbol of the unknown source data through the optimum denoiser formed based on a result of the training process for each context.

2. The denoising device of claim 1, wherein the determining of the optimum denoiser for the noise data comprises:

forming each denoiser for each of sliding window sizes based on the parameters obtained through the training, wherein the sliding window size k determines a size of the context; and selecting a specific sliding window size for minimizing an estimated loss by computing an estimated loss occurred when the noise data is reconstructed to recover the source data by using each denoiser formed for each sliding window size.

3. The denoising device of claim 2, wherein the outputting of the reconstructed data comprises outputting the reconstructed data through the optimum denoiser according to the specific sliding window size.

4. The denoising device of claim 1, wherein the noise data is corrupted data due to the noises occurred at a discrete memoryless channel as the source data passes through the discrete memoryless channel, and the noise occurrence probability is defined as a probability in which each symbol within the source data is transited to another symbol due to the noises at the discrete memoryless channel.

5. A noise removal method, comprising:

training a deep learning algorithm for obtaining an optimum denoiser by performing training operations comprising:

when corrupted noise data corrupted due to noises is received from unknown source data, deriving an estimated loss which is estimated from the noise data, by reconstructing each symbol within the noise data to recover the unknown source data based on a predefined noise occurrence probability;

defining a deep neural network model comprising parameters related with the reconstruction of the unknown source data from the noise data of the unknown source data;

computing context data composed of a sequence of symbols neighboring each symbol within the noise data of the unknown source data; and training the deep neural network model by using pseudo-training data, the pseudo-training data computed based on the estimated loss used as pseudo-label data and the context data; and implementing the deep learning algorithm by performing implementing operations comprising:

determining an optimum denoiser for the noise data using the deep neural network model; and outputting reconstructed data in which each symbol within the noise data is reconstructed to recover a symbol of the unknown source data through the optimum denoiser formed based on a result of the training process for each context.

6. The noise removal method of claim 5, wherein the determining the optimum denoiser for the noise data comprises:

before the outputting, forming each denoiser for each of sliding window sizes based on the parameters obtained through the training, wherein the sliding window size k determines a size of the context; and selecting a specific sliding window size for minimizing an estimated loss by computing an estimated loss occurred when the noise data is reconstructed to recover the source data using each denoiser formed for each sliding window size.

7. The noise removal method of claim 6, wherein the outputting reconstructed data comprises outputting the reconstructed data with the optimum denoiser according to the specific sliding window size.

8. The noise removal method of claim 5, wherein the noise data is corrupted data due to the noises occurred at a discrete memoryless channel as the source data passes through the discrete memoryless channel, and the noise occurrence probability is defined as a probability in which each symbol within the source data is transited to another symbol due to the noises at the discrete memoryless channel.

9. A non-transitory computer readable medium comprising instructions to implement each process as set forth in claim 5.

* * * * *